US012647770B2

(12) United States Patent
Duggi

(10) Patent No.: US 12,647,770 B2
(45) Date of Patent: Jun. 2, 2026

(54) METHOD AND SYSTEM FOR PROVIDING DYNAMIC IMEI RE-ASSIGNMENT IN A MULTI-SIM ELECTRONIC DEVICE

(71) Applicant: Samsung Electronics Co., Ltd., Suwon-si (KR)

(72) Inventor: Mohan Reddy Duggi, Basking Ridge, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 285 days.

(21) Appl. No.: 18/488,405

(22) Filed: Oct. 17, 2023

(65) Prior Publication Data

US 2025/0126457 A1 Apr. 17, 2025

(51) Int. Cl.
*H04W 8/18* (2009.01)
(52) U.S. Cl.
CPC ..................................... *H04W 8/18* (2013.01)
(58) Field of Classification Search
CPC ....................................................... H04W 8/18
See application file for complete search history.

(56) References Cited

U.S. PATENT DOCUMENTS

| | | | |
|---|---|---|---|
| 11,445,435 B2 | 9/2022 | Di Girolamo et al. | |
| 11,523,269 B2 | 12/2022 | Bouskila et al. | |
| 2020/0236180 A1* | 7/2020 | Yoshikawa | ........... H04W 88/08 |
| 2022/0022014 A1* | 1/2022 | Li | ........................... H04W 4/50 |
| 2022/0150815 A1 | 5/2022 | Korneluk et al. | |
| 2022/0248360 A1 | 8/2022 | Hong | |
| 2023/0054451 A1 | 2/2023 | Li et al. | |

FOREIGN PATENT DOCUMENTS

KR 20230078076 A 6/2023

* cited by examiner

*Primary Examiner* — Myron Wyche

(57) ABSTRACT
A method includes providing, by at least one processing device, a first set of assignments of international mobile equipment identifiers (IMEIs) to a plurality of subscriber identity modules (SIMs) associated with an electronic device. The method also includes monitoring, by the at least one processing device, each of a plurality of service registration statuses associated with the SIMs for a service registration failure. The method further includes, in response to at least one service registration failure being detected, providing, by the at least one processing device, a second set of assignments of IMEIs to the SIMs. The second set of assignments is different from the first set of assignments.

20 Claims, 5 Drawing Sheets

METHOD AND SYSTEM FOR PROVIDING DYNAMIC IMEI RE-ASSIGNMENT IN A MULTI-SIM ELECTRONIC DEVICE

TECHNICAL FIELD

This disclosure relates generally to communication systems and methods. More specifically, this disclosure relates to a method and system for providing dynamic international mobile equipment identifier (IMEI) re-assignment in a multi-subscriber identity module (SIM) electronic device.

BACKGROUND

Many mobile electronic devices, such as smartphones and tablet computers, include multiple subscriber identity modules (SIMs). Assignments of international mobile equipment identifiers (IMEIs) to SIMs is typically a device-side decision. Depending on the electronic device, these assignments may be provided by fixed or dynamic mapping of IMEIs to SIMs. When fixed mapping may be unsuccessful, dynamic mapping of IMEIs to SIMs may be a possible solution. However, some carriers may be unable to provide at least a portion of the services for a device or may lock the device entirely when a particular IMEI dynamically mapped to a SIM is not a match for the IMEI expected by the carrier.

SUMMARY

This disclosure relates to a method and system for providing dynamic international mobile equipment identifier (IMEI) re-assignment in a multi-subscriber identity module (SIM) electronic device.

In a first embodiment, a method includes providing, by at least one processing device, a first set of assignments of IMEIs to a plurality of SIMs associated with an electronic device. The method also includes monitoring, by the at least one processing device, each of a plurality of service registration statuses associated with the SIMs for a service registration failure. The method further includes, in response to at least one service registration failure being detected, providing, by the at least one processing device, a second set of assignments of IMEIs to the SIMs. The second set of assignments is different from the first set of assignments.

In a second embodiment, an electronic device includes a plurality of SIMs and at least one processing device. The at least one processing device is configured to provide a first set of assignments of IMEIs to the plurality of SIMs and monitor each of a plurality of service registration statuses associated with the SIMs for a service registration failure. The at least one processing device is also configured, in response to at least one service registration failure being detected, to provide a second set of assignments of IMEIs to the SIMs. The second set of assignments is different from the first set of assignments.

In a third embodiment, a non-transitory machine-readable medium contains instructions that when executed cause at least one processor to provide a first set of assignments of IMEIs to a plurality of SIMs. The non-transitory machine-readable medium also contains instructions that when executed cause the at least one processor to monitor each of a plurality of service registration statuses associated with the SIMs for a service registration failure. The non-transitory machine-readable medium further contains instructions that when executed cause the at least one processor, in response to at least one service registration failure being detected, to provide a second set of assignments of IMEIs to the SIMs. The second set of assignments is different from the first set of assignments.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory, computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOME-POD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 5, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include multiple subscriber identity modules (SIMs). Assignments of international mobile equipment identifiers (IMEIs) to SIMs is typically a device-side decision. Depending on the electronic device, these assignments may be provided by fixed or dynamic mapping of IMEIs to SIMs. When fixed mapping may be unsuccessful, dynamic mapping of IMEIs to SIMs may be a possible solution. However, some carriers may be unable to provide at least a portion of the services for a device or may lock the device entirely when a particular IMEI dynamically mapped to a SIM is not a match for the IMEI expected by the carrier.

Because of these types of issues, some currently implemented methods of providing dynamic mapping of IMEIs to SIMs include maintaining a database of configuration rules regarding carrier-specific IMEI dependencies. For these methods, electronic devices must be able to access these stored configuration rules for each possible carrier in order to consistently provide successful IMEI mapping. Furthermore, when any carrier makes a change to its configuration rules, this also requires updating the stored configuration rules in the database in order to maintain proper functionality of the devices. Otherwise, if a carrier has changed its configuration rules and those rules are not updated in the database, these current methods for dynamic IMEI mapping may fail.

This disclosure provides various techniques for dynamic IMEI re-assignment in a multi-SIM electronic device. As described in more detail below, dynamic IMEI mapping may be successfully provided by a multi-SIM electronic device regardless of the configuration rules of any carrier. Thus, carrier-specific IMEI dependencies are not required to be stored or maintained for these techniques to be implemented. In addition, any unexpected or unknown updates or changes to configuration rules by a carrier may not result in an IMEI mapping failure. In this way, the disclosed techniques can be used to provide dynamic IMEI re-assignment successfully, even when configuration rules may have been changed or updated, without requiring any knowledge of or access to those rules.

Figure 1:
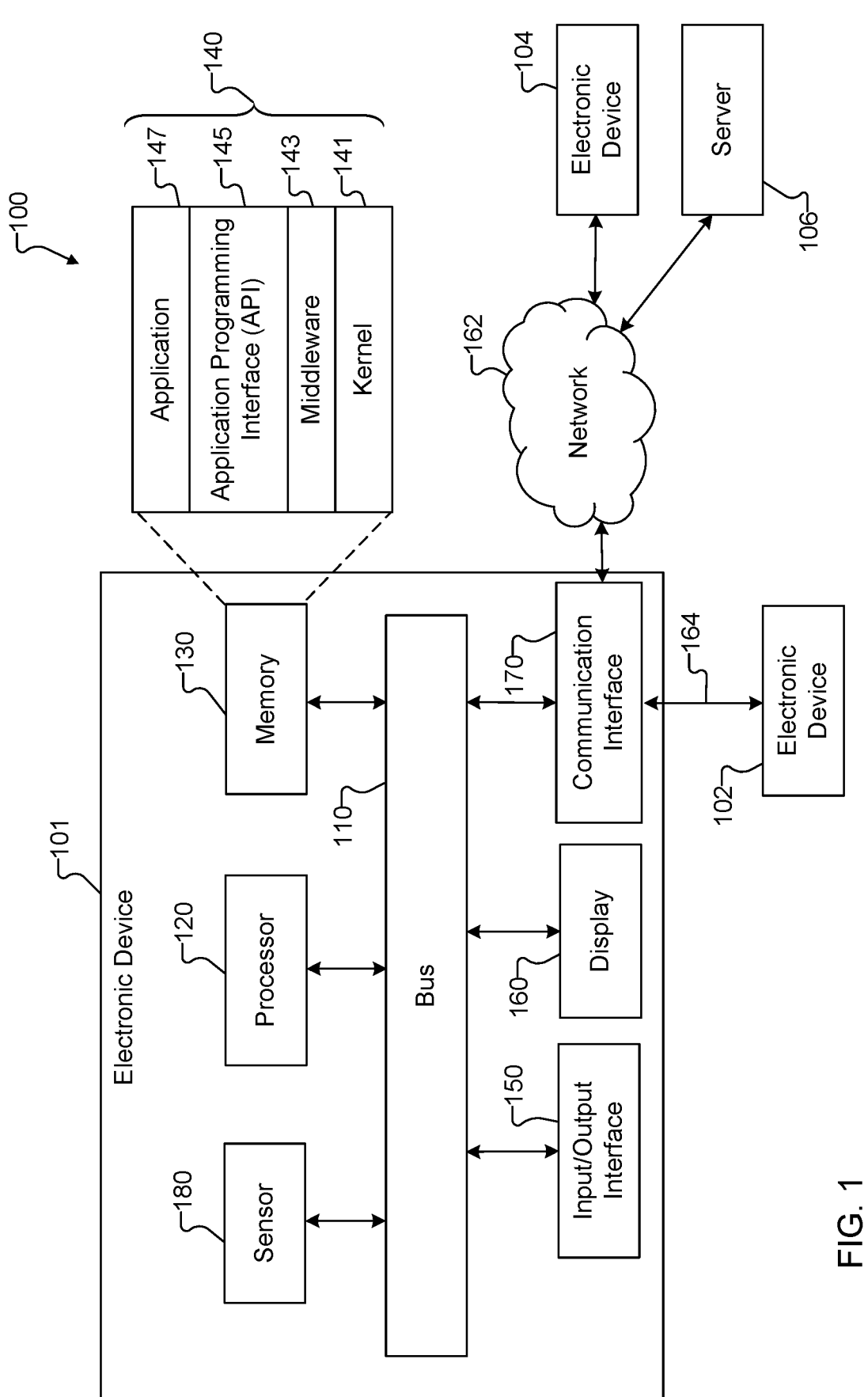
FIG. 1 illustrates an example of a network configuration including an electronic device in accordance with this disclosure.

FIG. 1 illustrates an example of a network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration

100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to provide dynamic IMEI re-assignment in a multi-SIM electronic device 101 without reference to any carrier-specific configuration rules. The processor 120 may also be used to provide an error message to a user when the multi-SIM electronic device 101 fails to attach to a network and successfully register for services following IMEI re-assignment when the failure is unrelated to IMEI assignment.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for performing dynamic IMEI re-assignment for a multi-SIM electronic device 101. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectrome-chanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as a head-mounted device (HMD)). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
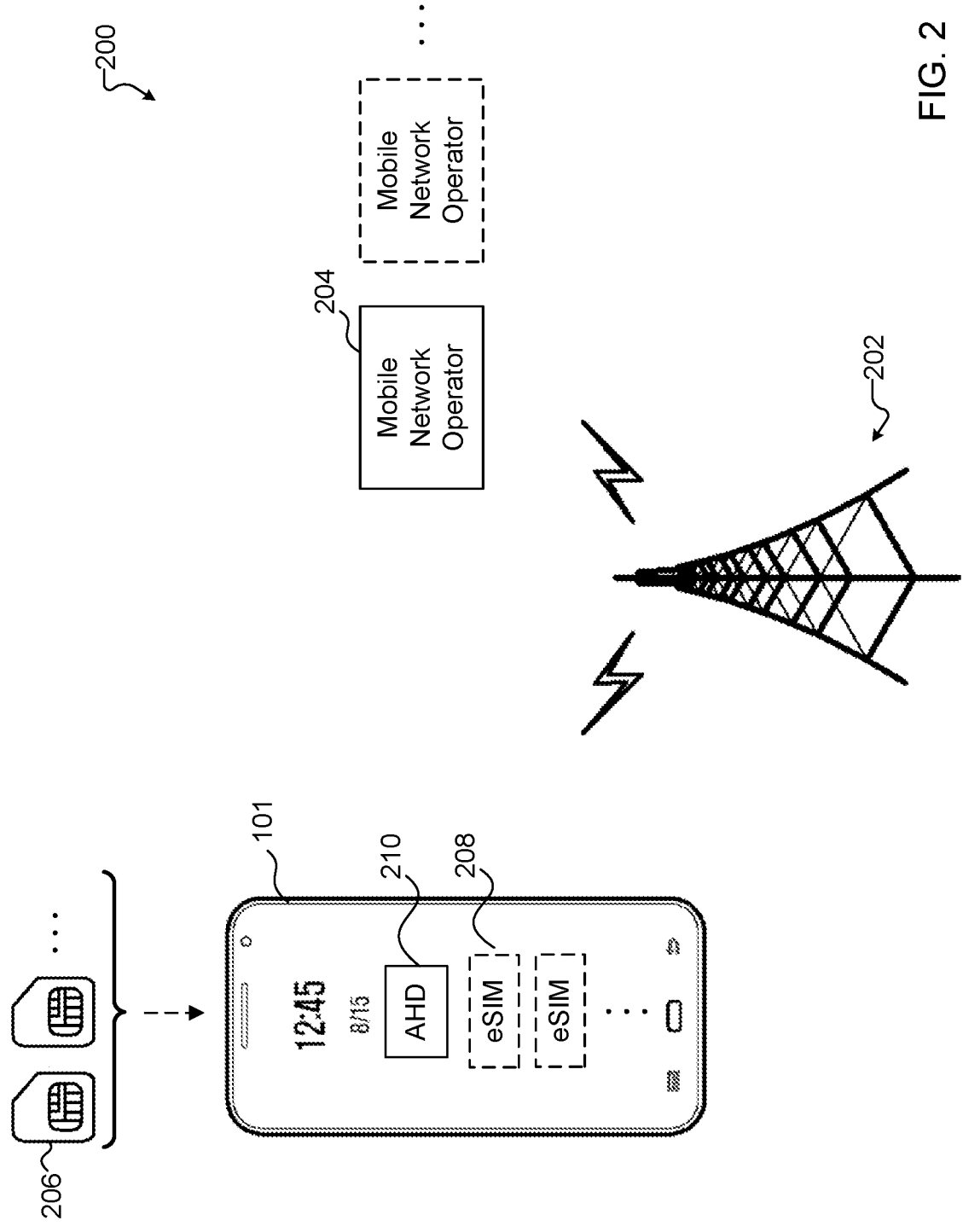
FIG. 2 illustrates an example system for providing dynamic international mobile equipment identifier (IMEI) re-assignment in a multi-subscriber identity module (SIM) electronic device in accordance with this disclosure.

FIG. 2 illustrates an example system 200 for providing dynamic IMEI re-assignment in a multi-SIM electronic device 101 in accordance with this disclosure. For ease of explanation, the system 200 shown in FIG. 2 is described as being implemented on or supported by the electronic device 101 in the network configuration 100 of FIG. 1. However, the system 200 shown in FIG. 2 could be used with any other suitable electronic device(s) and in any other suitable system (s).

As shown in FIG. 2, the system 200 includes the electronic device 101, one or more base stations 202, and at least one mobile network operator (MNO) 204. The electronic device 101 includes a multi-SIM electronic device. As shown here, the electronic device 101 may be configured to receive one or more physical SIMs (pSIMs) 206 and/or may include one or more embedded SIMs (eSIMs) 208. For example, in some embodiments, the electronic device 101 may include a single pSIM 206 and a single eSIM 208. In other embodiments, the electronic device 101 may include two or more pSIMs 206, two or more eSIMs 208, or any suitable combination of both pSIMs 206 and eSIMs 208. For embodiments including at least one pSIM 206, the electronic device 101 can be configured to receive and retain each pSIM 206, which may be inserted into the device 101 and may therefore be detachable from the device 101. For embodiments including at least one eSIM 208, each eSIM 208 may be pre-embedded in the electronic device 101 and may not be detachable.

The electronic device 101 is configured to communicate through the base station(s) 202 with at least one MNO 204. Each SIM 206 or 208 may be independently configured to attach to a particular MNO 204. Thus, for example, if the electronic device 101 includes one pSIM 206 and one eSIM 208, the pSIM 206 may be configured to attach to a first MNO 204, while the eSIM 208 may be configured to attach to a second MNO 204. As another example, both the pSIM 206 and the eSIM 208 may be configured to attach to the same MNO 204. For embodiments in which the electronic device 101 has more than two SIMs 206 and 208, any one or more of the SIMS 206 and 208 may be configured to attach to any one of the MNOs 204.

The electronic device 101 also includes an assignment history database (AHD) 210. As described in more detail below in connection with FIGS. 3 through 5, the assignment history database 210 may be configured to store information related to the assignment history of IMEIs to the SIMS 206 and 208. Also, the electronic device 101 may be configured to search the assignment history database 210 to determine whether at least a portion of a set of assignments of IMEIs to the SIMS 206 and 208 has been previously attempted and failed. For example, in some embodiments, the assignment history database 210 may be configured to store an identifier for a SIM 206 or 208 for which a service registration failure has been detected while a specific IMEI was assigned to that SIM 206 or 208. As a particular example, the identifier may include an integrated circuit card identification (ICCID) for the SIM 206 or 208. In other embodiments, the assignment history database 210 may be configured to store one or more IMEI/ICCID pairs, where each stored pair indicates that a specific IMEI previously assigned to a particular SIM 206 or 208 has resulted in at least one service registration failure for that particular SIM 206 or 208.

In some embodiments, the assignment history database 210 may be configured to store any suitable number of entries, such as up to 100 entries or up to 1,000 entries. Also, in some embodiments, the processor 120 may be configured to purge older entries from the assignment history database 210 to make space for new entries in response to the assignment history database 210 being full. In particular embodiments, the processor 120 may be configured to implement a Least Recently Used (LRU) scheme to determine which entries to purge. However, it will be understood that the processor 120 may be configured to implement any other suitable purging scheme to provide space for new entries in response to the assignment history database 210 being full.

Although FIG. 2 illustrates one example of a system 200 for providing dynamic IMEI re-assignment in a multi-SIM electronic device 101, various changes may be made to FIG. 2. For example, the system 200 of FIG. 2 has been simplified for ease of illustration and explanation.

Figure 3:
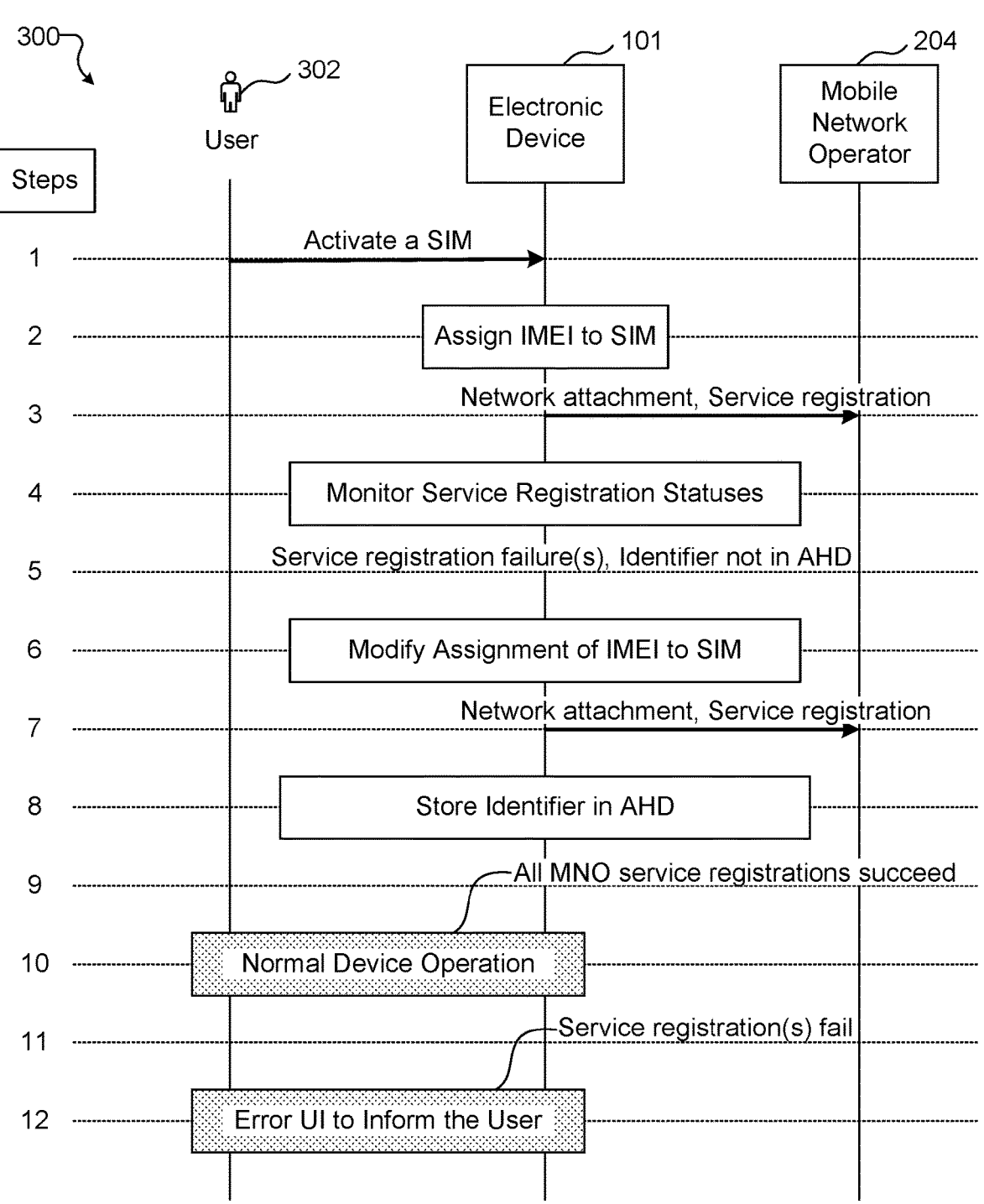
FIG. 3 illustrates an example signaling diagram for providing dynamic IMEI re-assignment in a multi-SIM electronic device in accordance with this disclosure.

FIG. 3 illustrates an example signaling diagram 300 for providing dynamic IMEI re-assignment in a multi-SIM electronic device 101 in accordance with this disclosure. For ease of explanation, the signaling diagram 300 shown in FIG. 3 is described as being used in conjunction with the electronic device 101 of FIGS. 1 and 2. However, the signaling diagram 300 shown in FIG. 3 could be used with any other suitable electronic device(s) and in any other suitable system(s).

As shown in FIG. 3, a user 302 activates a SIM 206 or 208 in the electronic device 101 at step 1. This may include, for example, the user 302 inserting a pSIM 206 into the electronic device 101 or indicating a desire to use an eSIM 208 in the electronic device 101. At step 2, the electronic device 101 assigns an IMEI to the SIM 206 or 208. At step 3, the electronic device 101 attaches to an MNO 204, and an attempt is made to register and activate each of a plurality of cellular services provided by the MNO 204 to the electronic device 101. In some embodiments, these services may include one or more of 4G/5G voice calling, 4G/5G video calling, WiFi calling, messaging, data, and/or any other suitable service(s) that the MNO 204 is configured to provide to the electronic device 101.

At step 4, the electronic device 101 monitors a service registration status for each of the services being registered and activated in step 3. At step 5, in response to least one service registration failure being detected based on the monitoring of the service registration statuses, the electronic device 101 searches the assignment history database 210 for an identifier indicating that a different IMEI has been previously assigned to the SIM 206 or 208 and resulted in at least one service registration failure. For example, in some embodiments, the identifier may include the ICCID associated with the SIM 206 or 208. In response to the identifier being absent from the assignment history database 210 (indicating that the different IMEI has not been previously assigned to the SIM 206 or 208), the electronic device 101 modifies the assignment of the IMEI to the SIM 206 or 208 by assigning the different IMEI to the SIM 206 or 208 at step 6.

At step 7, the electronic device 101 again attaches to the MNO 204, and another attempt is made to register and activate each of the plurality of cellular services provided by the MNO 204 to the electronic device 101. At step 8, an identifier is stored in the assignment history database 210 as an indication that at least one of the services failed to register successfully while the previous IMEI was assigned to the SIM 206 or 208. For example, in some embodiments, the ICCID associated with the SIM 206 or 208 may be stored in the assignment history database 210.

After network attachment and the initiation of service registration at step 7 and storing the identifier at step 8, service registration statuses may again be monitored at step

4 to verify whether the different IMEI results in successful service registration. Thus, in this case, step 4 may be repeated, either resulting in successful network attachment and service registration at step 9 (followed by normal device operation at step 10) or resulting in another service registration failure. At step 5, if another service registration failure is detected with the different IMEI, the identifier for the SIM 206 or 208 associated with that service registration failure is found in the assignment history database 210. This results in the electronic device 101 determining that service registration failure has occurred at step 11, which can be followed by an error message being displayed for the user 302 at step 12.

In this way, the electronic device 101 may provide normal device operation for the user 302 at step 10 in response to the services being registered successfully at step 9, based on successful service registration either at step 3 with the original IMEI assignment or at step 7 with the modified IMEI assignment. However, if at least one of the service registrations fails at step 11 after IMEI re-assignment at step 6, the electronic device 101 provides the error message to the user 302 indicating that network attachment has failed due to a cause unrelated to IMEI assignment.

Although FIG. 3 illustrates one example of a signaling diagram 300 for providing dynamic IMEI re-assignment in a multi-SIM electronic device 101, various changes may be made to FIG. 3. For example, the described embodiment assumes that an electronic device 101 includes two SIMs 206 and 208. However, for embodiments in which the electronic device 101 includes three or more SIMs 206 and 208, the identifier stored in the assignment history database 210 could include an IMEI paired with an ICCID for a particular SIM 206 or 208. For these embodiments, the identifier may be stored in the assignment history database 210 before a search for the identifier is made. In addition, for these embodiments, the error message may be sent to the user 302 after each possible pair of IMEIs with ICCIDs has been attempted through re-assignment.

Figure 4:
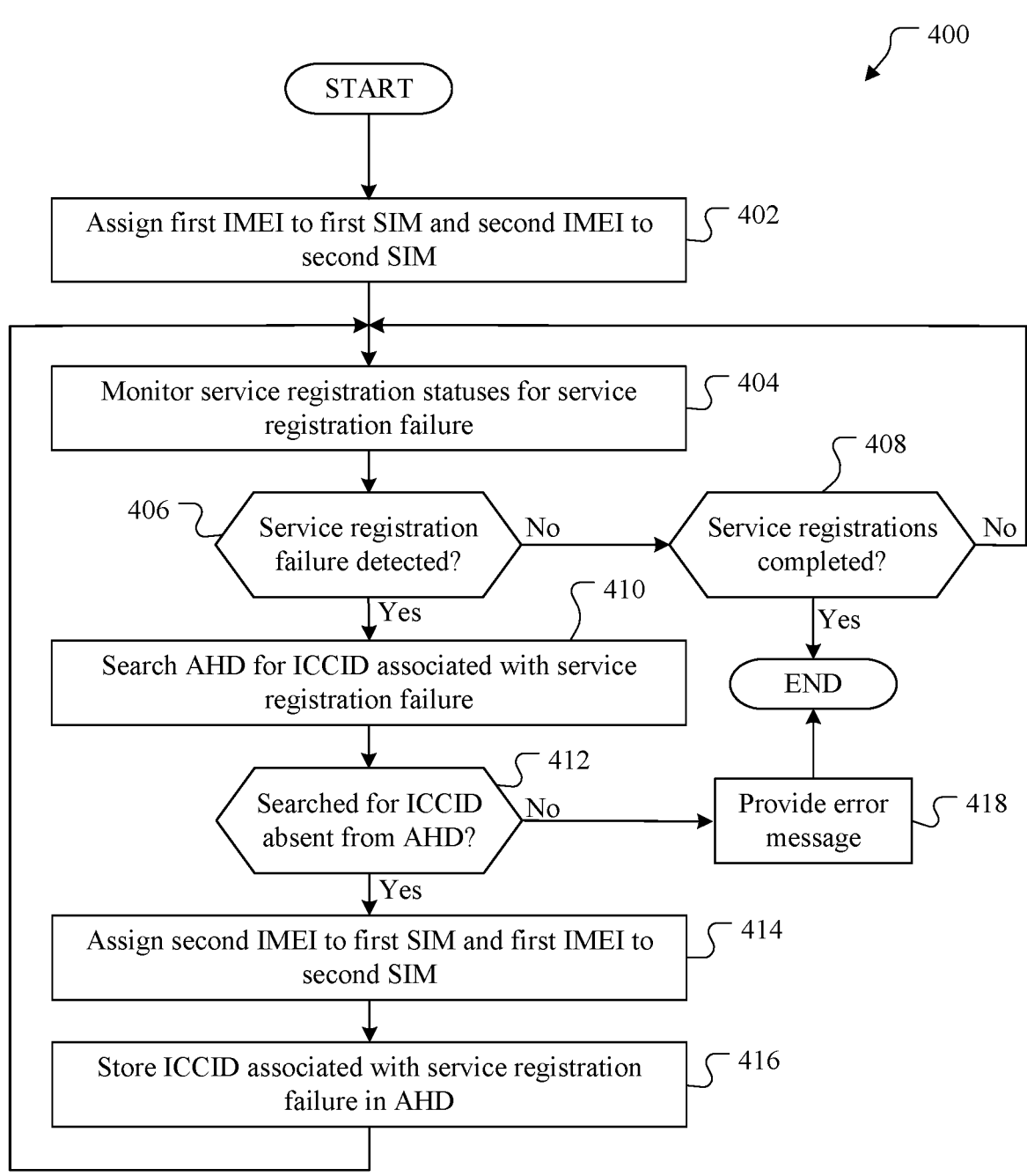
FIG. 4 illustrates an example method for providing dynamic IMEI re-assignment in a multi-SIM electronic device in accordance with this disclosure.

FIG. 4 illustrates an example method 400 for providing dynamic IMEI re-assignment in a multi-SIM electronic device 101 in accordance with this disclosure. For ease of explanation, the method 400 shown in FIG. 4 is described as being performed by the electronic device 101 of FIGS. 1 and 2. However, the method 400 shown in FIG. 4 could be used with any other suitable electronic device(s) and in any other suitable system(s).

As shown in FIG. 4, a first IMEI is assigned to a first SIM 206 or 208 and a second IMEI is assigned to a second SIM 206 or 208 at step 402. This may include, for example, the processor 120 of the electronic device 101 assigning IMEI1 to the first SIM 206 or 208 and assigning IMEI2 to the second SIM 206 or 208. A plurality of service registration statuses is monitored for service registration failure at step 404. This may include, for example, the processor 120 of the electronic device 101 monitoring the status of each service being registered and activated during network attachment of the electronic device 101 to an MNO 204. In some cases, the services being registered and activated may include one or more of 4G/5G voice calling, 4G/5G video calling, WiFi calling, messaging, data, and/or any other suitable service(s) that the MNO 204 is configured to provide to the electronic device 101.

In response to no service registration failures being detected at step 406, a determination is made whether the service registrations have been completed at step 408. If not, the plurality of service registration statuses continues to be monitored for service registration failure at step 404. This may include, for example, the processor 120 of the electronic device 101 detecting no service registration failures at step 406 while also determining that service registration has not yet been completed at step 408. In response to no service registration failures being detected at step 406 and the service registrations being completed at step 408, the electronic device 101 has been successfully attached with all service registrations completed, and the method 400 comes to an end with the electronic device 101 operating as normal. This may include, for example, the processor 120 of the electronic device 101 detecting no service registration failures at step 406 while also determining that service registrations have been completed at step 408.

In response to a service registration failure being detected at step 406, the assignment history database 210 is searched for an ICCID associated with the service registration failure at step 410. This may include, for example, the processor 120 of the electronic device 101 detecting a service registration status indicating a failure to register the corresponding service followed by the processor 120 searching the assignment history database 210 for the ICCID associated with the SIM 206 or 208 for which the service registration failure was detected. In response to the ICCID associated with the service registration failure being absent from the assignment history database 210 at step 412, the second IMEI is assigned to the first SIM 206 or 208 and the first IMEI is assigned to the second SIM 206 or 208 at step 414. This may include, for example, the processor 120 of the electronic device 101 assigning IMEI2 to the first SIM 206 or 208 and assigning IMEI1 to the second SIM 206 or 208. The ICCID associated with the service registration failure is stored in the assignment history database 210 at step 416. This may include, for example, the processor 120 of the electronic device 101 storing in the assignment history database 210 the ICCID associated with the SIM 206 or 208 for which the service registration failure was detected. The method 400 then returns to monitoring the plurality of service registration statuses for service registration failure at step 404.

Thus, as the ICCID associated with the SIM 206 or 208 for which the service registration failure was detected is stored in the assignment history database 210 at step 416, the same ICCID would be found in the assignment history database 210 at step 412 in response to another service registration failure being detected for the same SIM 206 or 208 at step 406 and the assignment history database 210 being searched for the ICCID at step 410. Because the ICCID in this case would be found at step 412, this indicates that the SIM 206 or 208 associated with that ICCID has already had a service registration failure with the other IMEI, and an error message can be provided to the user 302 at step 418, bringing the method 400 to an end. This may include, for example, the processor 120 of the electronic device 101 displaying the error message on the display 160 of the electronic device 101. This can prevent the electronic device 101 from looping through re-assigning the same two IMEIs to the first and second SIMs 206 and 208 multiple times. In this case, the second service registration failure detected at step 406 might be assumed to be unrelated to IMEI assignment, and the user 302 can be prompted by the error message to determine another cause for the failure.

In this way, the method 400 provides dynamic IMEI re-assignment in a multi-SIM electronic device 101, which allows IMEIs to be re-assigned when at least one service registration failure is detected in order to allow successful network attachment and service registration without reference to stored carrier policies or configuration rules of any MNOs 204. Thus, network attachment and service registration may be successfully provided regardless of the carrier policies or configuration rules, including any updates to those policies or rules, allowing the electronic device 101 to recover from possible errors relating to those policies or rules.

Although FIG. 4 illustrates one example of a method 400 for providing dynamic IMEI re-assignment in a multi-SIM electronic device 101, various changes may be made to FIG. 4. For example, while shown as a series of steps, various steps in FIG. 4 may overlap, occur in parallel, occur in a different order, or occur any number of times (including zero times).

Figure 5:
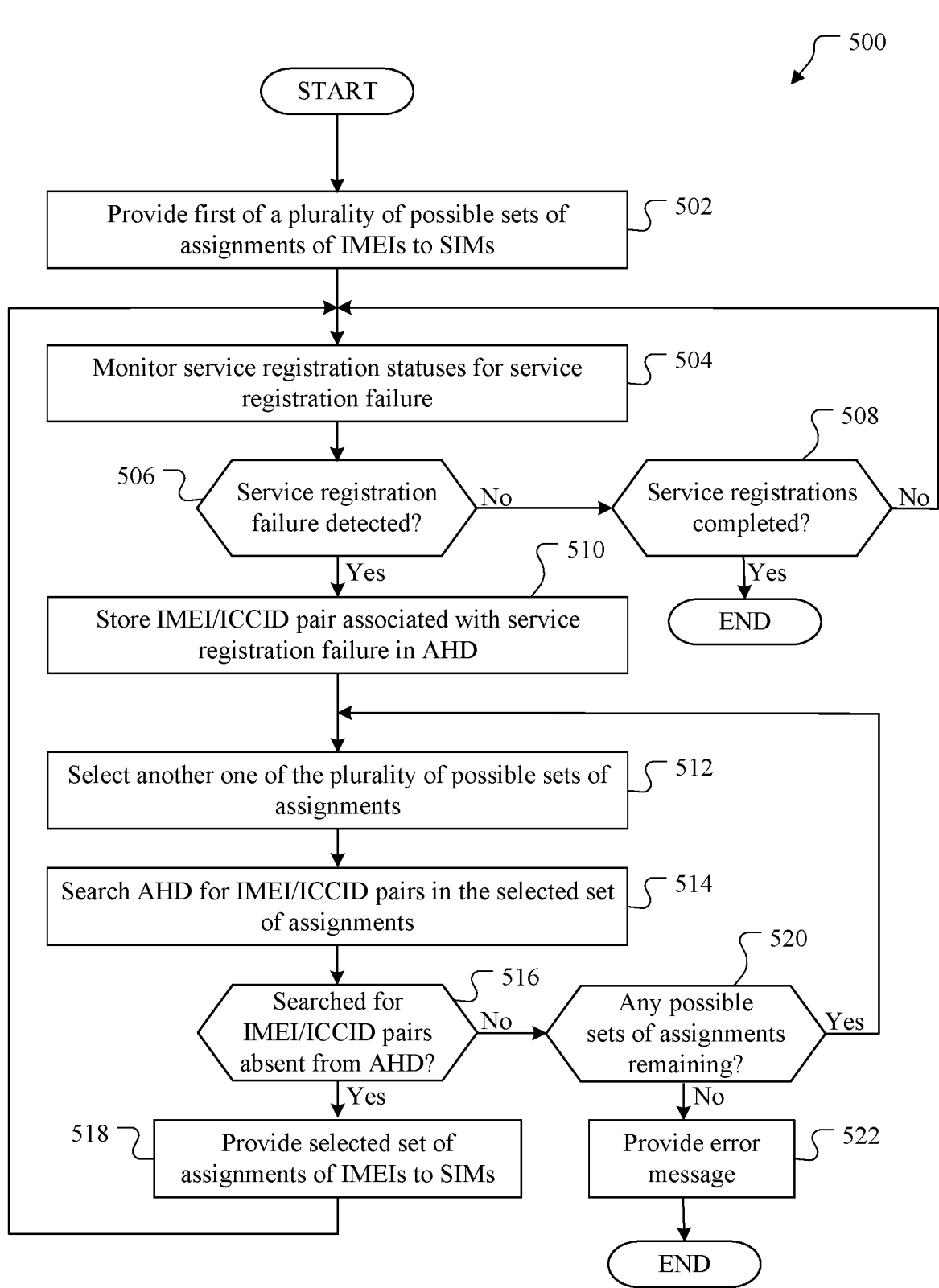
FIG. 5 illustrates another example method for providing dynamic IMEI re-assignment in a multi-SIM electronic device in accordance with this disclosure.

FIG. 5 illustrates another example method 500 for providing dynamic IMEI re-assignment in a multi-SIM electronic device in accordance with this disclosure. For ease of explanation, the method 500 shown in FIG. 5 is described as being performed by the electronic device 101 of FIGS. 1 and 2. However, the method 500 shown in FIG. 5 could be used with any other suitable electronic device(s) and in any other suitable system(s).

As shown in FIG. 5, a first set of assignments of IMEIs selected from among a plurality of possible sets of assignments is provided to the SIMS 206 and 208 in the electronic device 101 at step 502. This may include, for example, the processor 120 of the electronic device 101 assigning a first set of assignments of IMEIs out of the plurality of possible sets of assignments of IMEIs to the SIMS 206 and 208. In some cases, the plurality of possible sets of assignments of IMEIs to the SIMS 206 and 208 may include a set of assignments for each possible mapping combination of the IMEIs to the SIMS 206 and 208. As a particular example, assume the electronic device 101 includes three SIMs 206 and 208, in which case the plurality of possible sets of assignments may include those shown in Table 1 below.

TABLE 1

| Set of Assignments | IMEI assigned to first SIM | IMEI assigned to second SIM | IMEI assigned to third SIM |
|---|---|---|---|
| $1^{st}$ | 1 | 2 | 3 |
| $2^{nd}$ | 1 | 3 | 2 |
| $3^{rd}$ | 2 | 1 | 3 |
| $4^{th}$ | 2 | 3 | 1 |
| $5^{th}$ | 3 | 1 | 2 |
| $6^{th}$ | 3 | 2 | 1 |

It will be understood that the sets of assignments shown in Table 1 above may be ordered in any manner and that the labeling of the particular sets of assignments as $1^{st}$ through $6^{th}$ are simply provided as one particular example. For embodiments in which the electronic device 101 includes four SIMS 206 and 208, the plurality of possible sets of assignments may include twenty-four possible assignment combinations of four IMEIs to the four SIMS 206 and 208 in any suitable order. Note that possible sets of assignments may be defined for any suitable number of two or more SIMs 206 and 208.

A plurality of service registration statuses is monitored for service registration failure at step 504. This may include, for example, the processor 120 of the electronic device 101 monitoring the status of each service being registered and activated during network attachment of the electronic device 101 to an MNO 204. In some cases, the services being registered and activated may include one or more of 4G/5G voice calling, 4G/5G video calling, WiFi calling, messaging, data, and/or any other suitable service(s) that the MNO 204 is configured to provide to the electronic device 101.

In response to no service registration failures being detected at step 506 while the service registrations have not been completed at step 508, the plurality of service registration statuses continues to be monitored for service registration failure at step 504. This may include, for example, the processor 120 of the electronic device 101 detecting no service registration failures at step 506 while also determining that service registration has not yet been completed at step 508. In response to no service registration failures being detected at step 506 and the service registrations being completed at step 508, the electronic device 101 has been successfully attached with all service registrations completed, and the method 500 comes to an end with the electronic device 101 operating as normal. This may include, for example, the processor 120 of the electronic device 101 detecting no service registration failures at step 506 while also determining that service registrations have been completed at step 508.

In response to a service registration failure being detected at step 506, an IMEI/ICCID pair associated with the service registration failure is stored in the assignment history database (AHD) 210 at step 510. This may include, for example, the processor 120 of the electronic device 101 storing in the assignment history database 210 the ICCID associated with the SIM 206 or 208 for which the service registration failure was detected, along with the specific IMEI that was assigned to that SIM 206 or 208. Another one of the plurality of possible sets of assignments is selected at step 512. This may include, for example, the processor 120 of the electronic device 101 selecting a subsequent set of assignments. Using the particular example of the assignments shown in Table 1 above, the processor 120 may select the set of assignments following the most recently provided set of assignments. For example, after a service registration failure is detected using the first set of assignments, the processor 120 may select the second set of assignments.

The assignment history database 210 is searched for the IMEI/ICCID pairs corresponding to the selected set of assignments at step 514. This may include, for example, the processor 120 of the electronic device 101 searching the assignment history database 210 for each of the IMEI/ICCID pairs included in the selected set of assignments. Using the particular example of the assignments shown in Table 1 above, when the processor 120 selects the second set of assignments at step 512, the processor 120 searches the assignment history database 210 for the pairs including (i) IMEI1 and the ICCID for the first SIM 206 or 208, (ii) IMEI3 and the ICCID for the second SIM 206 or 208, and (iii) IMEI2 and the ICCID for the third SIM 206 or 208.

In response to each of the IMEI/ICCID pairs corresponding to the selected set of assignments searched for at step 514 being absent from the assignment history database 210 at step 516, that selected set of assignments of IMEIs is provided to the SIMS 206 and 208 at step 518. This may include, for example, the processor 120 of the electronic device 101 assigning the selected set of assignments to the SIMs 206 and 208. The method 500 then returns to monitoring the plurality of service registration statuses for service registration failure at step 504. However, in response to any of the IMEI/ICCID pairs corresponding to the selected set of assignments searched for at step 514 being found in the assignment history database 210 at step 516, a determination in that case is made regarding whether there are any possible sets of assignments remaining to be attempted at step 520. This may include, for example, the processor 120 of the electronic device 101 determining whether each of the possible sets of assignments has been selected at step 512 and searched for in the assignment history database 210 at step 514. Using the particular example of the assignments shown in Table 1 above, the processor 120 may cycle through each of the six possible sets of assignments before making the determination that no more sets of assignments remain to be attempted.

In response to a determination that at least one possible set of assignments remains that has not been attempted at step 520, yet another one of the plurality of possible sets of assignments is selected at step 512. This may include, for example, the processor 120 of the electronic device 101 selecting another subsequent set of assignments. As a particular example, if the most recently attempted set of assignments was the second set of assignments, the processor 120 may select the third set of assignments. The method 500 continues as before with the assignment history database 210 being searched again based on the set of assignments that was selected at step 512. Thus, the assignment history database 210 may be searched at step 514 until a set of assignments is selected whose corresponding IMEI/ICCID pairs are absent from the assignment history database 210 at step 516, after which that set of assignments may be provided to the SIMS 206 and 208 at step 518.

In response to a determination that no possible sets of assignments remain to be attempted at step 520, an error message may be provided to the user 302 at step 522. This may include, for example, the processor 120 of the electronic device 101 displaying the error message on the display 160 of the electronic device 101. Providing an error message at step 522 when a determination is made that no possible sets of assignments remain to be attempted at step 520 can prevent the electronic device 101 from looping through re-assigning the same sets of assignments of IMEIs multiple times and brings the method 500 to an end. In this case, the service registration failures detected at step 506 might be assumed to be unrelated to IMEI assignment, and the user 302 can be prompted by the error message to determine another cause for the failure.

In this way, the method 500 provides dynamic IMEI re-assignment in a multi-SIM electronic device 101, which allows IMEIs to be re-assigned when at least one service registration failure is detected in order to allow successful network attachment and service registration without reference to stored carrier policies or configuration rules of any MNOs 204. Thus, network attachment and service registration may be successfully provided regardless of the carrier policies or configuration rules, including any updates to those policies or rules, allowing the electronic device 101 to recover from possible errors relating to those policies or rules.

Although FIG. 5 illustrates another example of a method 500 for providing dynamic IMEI re-assignment in a multi-SIM electronic device 101, various changes may be made to FIG. 5. For example, while shown as a series of steps, various steps in FIG. 5 may overlap, occur in parallel, occur in a different order, or occur any number of times (including zero times).

It should be noted that the functions shown in or described with respect to FIGS. 2 through 5 can be implemented in an electronic device 101 or other device in any suitable manner. For example, in some embodiments, at least some of the functions shown in or described with respect to FIGS. 2 through 5 can be implemented or supported using one or more software applications or other software instructions that are executed by the processor 120 of the electronic device 101 or other device. In other embodiments, at least some of the functions shown in or described with respect to FIGS. 2 through 5 can be implemented or supported using dedicated hardware components. In general, the functions shown in or described with respect to FIGS. 2 through 5 can be performed using any suitable hardware or any suitable combination of hardware and software/firmware instructions.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

providing, by at least one processing device, a first set of assignments of international mobile equipment identifiers (IMEIs) to a plurality of subscriber identity modules (SIMs) associated with an electronic device by assigning a first IMEI to a first SIM and assigning a second IMEI to a second SIM, wherein the first SIM is associated with a first integrated circuit card identification (ICCID) and the second SIM is associated with a second ICCID;

monitoring, by the at least one processing device, each of a plurality of service registration statuses associated with the SIMs for a service registration failure;

in response to at least one service registration failure being detected, providing, by the at least one processing device, a second set of assignments of IMEIs to the SIMs by assigning the second IMEI to the first SIM and assigning the first IMEI to the second SIM, wherein the second set of assignments is different from the first set of assignments;

in response to the at least one service registration failure being detected for the first SIM, storing the first ICCID in an assignment history database; and in response to the at least one service registration failure being detected for the second SIM, storing the second ICCID in the assignment history database.

2. The method of claim 1, further comprising, subsequent to providing the second set of assignments of IMEIs to the SIMS:

again monitoring each of the plurality of service registration statuses associated with the SIMs for a service registration failure;

in response to detecting at least one service registration failure for the first SIM, searching the assignment history database for the first ICCID;

in response to detecting at least one service registration failure for the second SIM, searching the assignment history database for the second ICCID; and in response to locating at least one of the first ICCID and the second ICCID in the assignment history database, providing an error message.

3. A method comprising:

providing, by at least one processing device, a first set of assignments of international mobile equipment identifiers (IMEIs) to a plurality of subscriber identity modules (SIMs) associated with an electronic device, wherein each of the SIMs is associated with an integrated circuit card identification (ICCID);

monitoring, by the at least one processing device, each of a plurality of service registration statuses associated with the SIMs for a service registration failure;

in response to at least one service registration failure being detected, providing, by the at least one processing device, a second set of assignments of IMEIs to the SIMs, wherein the second set of assignments is different from the first set of assignments, wherein the first set of assignments and the second set of assignments are selected from among a plurality of possible sets of assignments, and wherein each set of assignments comprises a set of IMEI/ICCID pairs, each IMEI/ICCID pair comprising an ICCID associated with a particular SIM and an IMEI assigned to the particular SIM by the corresponding set of assignments; and in response to the at least one service registration failure being detected for a first of the SIMs, storing, in an assignment history database, the IMEI/ICCID pair comprising the ICCID associated with the first SIM and the IMEI assigned to the first SIM by the first set of assignments.

4. The method of claim 3, further comprising:

in response to the at least one service registration failure being detected, searching the assignment history database for each of the IMEI/ICCID pairs corresponding to the second set of assignments;

wherein the second set of assignments is provided in response to each of the IMEI/ICCID pairs corresponding to the second set of assignments being absent from the assignment history database.

5. An electronic device comprising:

a plurality of subscriber identity modules (SIMs) including a first SIM and a second SIM, wherein the first SIM is associated with a first integrated circuit card identification (ICCID) and the second SIM is associated with a second ICCID;

an assignment history database; and at least one processing device configured to:

provide a first set of assignments of international mobile equipment identifiers (IMEIs) to the plurality of SIMs by assigning a first IMEI to the first SIM and assigning a second IMEI to the second SIM;

monitor each of a plurality of service registration statuses associated with the SIMs for a service registration failure;

in response to at least one service registration failure being detected, provide a second set of assignments of IMEIs to the SIMs by assigning the second IMEI to the first SIM and assigning the first IMEI to the second SIM, wherein the second set of assignments is different from the first set of assignments;

in response to the at least one service registration failure being detected for the first SIM, store the first ICCID in the assignment history database; and in response to the at least one service registration failure being detected for the second SIM, store the second ICCID in the assignment history database.

6. The electronic device of claim 5, wherein the at least one processing device is further configured to, subsequent to providing the second set of assignments of IMEIs to the SIMS:

again monitor each of the plurality of service registration statuses associated with the SIMs for a service registration failure;

in response to detecting at least one service registration failure for the first SIM, search the assignment history database for the first ICCID;

in response to detecting at least one service registration failure for the second SIM, search the assignment history database for the second ICCID; and in response to locating at least one of the first ICCID and the second ICCID in the assignment history database, provide an error message.

7. An electronic device comprising:

a plurality of subscriber identity modules (SIMs) including a first SIM, wherein each of the SIMs is associated with an integrated circuit card identification (ICCID);

an assignment history database; and at least one processing device configured to:

provide a first set of assignments of international mobile equipment identifiers (IMEIs) to the plurality of SIMs;

monitor each of a plurality of service registration statuses associated with the SIMs for a service registration failure;

in response to at least one service registration failure being detected, provide a second set of assignments of IMEIs to the SIMs, wherein the second set of assignments is different from the first set of assignments, wherein the at least one processing device is configured to select the first set of assignments and the second set of assignments from among a plurality of possible sets of assignments, and wherein each set of assignments comprises a set of IMEI/ICCID pairs, each IMEI/ICCID pair comprising an ICCID associated with a particular SIM and an IMEI assigned to the particular SIM by the corresponding set of assignments; and in response to the at least one service registration failure being detected for the first SIM, store, in the assignment history database, the IMEI/ICCID pair comprising the ICCID associated with the first SIM and the IMEI assigned to the first SIM by the first set of assignments.

8. The electronic device of claim 7, wherein the at least one processing device is further configured to:

in response to the at least one service registration failure being detected, search the assignment history database for each of the IMEI/ICCID pairs corresponding to the second set of assignments; and in response to each of the IMEI/ICCID pairs corresponding to the second set of assignments being absent from the assignment history database, provide the second set of assignments.

9. A non-transitory machine-readable medium containing instructions that when executed cause at least one processor to:

provide a first set of assignments of international mobile equipment identifiers (IMEIs) to a plurality of subscriber identity modules (SIMs) by assigning a first IMEI to a first SIM and assigning a second IMEI to a second SIM, wherein the first SIM is associated with a first integrated circuit card identification (ICCID) and the second SIM is associated with a second ICCID;

monitor each of a plurality of service registration statuses associated with the SIMs for a service registration failure;

in response to at least one service registration failure being detected, provide a second set of assignments of IMEIs to the SIMs by assigning the second IMEI to the first SIM and assigning the first IMEI to the second SIM, wherein the second set of assignments is different from the first set of assignments;

in response to the at least one service registration failure being detected for the first SIM, storing the first ICCID in an assignment history database; and in response to the at least one service registration failure being detected for the second SIM, storing the second ICCID in the assignment history database.

10. The non-transitory machine-readable medium of claim 9, further containing instructions that when executed cause the at least one processor, subsequent to providing the second set of assignments of IMEIs to the SIMS, to:

again monitor each of the plurality of service registration statuses associated with the SIMs for a service registration failure;

in response to detecting at least one service registration failure for the first SIM, search the assignment history database for the first ICCID;

in response to detecting at least one service registration failure for the second SIM, search the assignment history database for the second ICCID; and in response to locating at least one of the first ICCID and the second ICCID in the assignment history database, provide an error message.

11. A non-transitory machine-readable medium containing instructions that when executed cause at least one processor to:

provide a first set of assignments of international mobile equipment identifiers (IMEIs) to a plurality of subscriber identity modules (SIMs), wherein each of the SIMs is associated with an integrated circuit card identification (ICCID);

monitor each of a plurality of service registration statuses associated with the SIMs for a service registration failure;

in response to at least one service registration failure being detected, provide a second set of assignments of IMEIs to the SIMs, wherein the second set of assignments is different from the first set of assignments, wherein the instructions when executed cause the at least one processor to select the first set of assignments and the second set of assignments from among a plurality of possible sets of assignments, and wherein each set of assignments comprises a set of IMEI/ICCID pairs, each IMEI/ICCID pair comprising an ICCID associated with a particular SIM and an IMEI assigned to the particular SIM by the corresponding set of assignments; and in response to the at least one service registration failure being detected for a first of the SIMs, store, in an assignment history database, the IMEI/ICCID pair comprising the ICCID associated with the first SIM and the IMEI assigned to the first SIM by the first set of assignments.

12. The non-transitory machine-readable medium of claim 11, further containing instructions that when executed cause the at least one processor to:

in response to the at least one service registration failure being detected, search the assignment history database for each of the IMEI/ICCID pairs corresponding to the second set of assignments; and in response to each of the IMEI/ICCID pairs corresponding to the second set of assignments being absent from the assignment history database, provide the second set of assignments.

13. The method of claim 1, further comprising:

purging one or more entries from the assignment history database in response to the assignment history database being full.

14. The method of claim 13, further comprising:

implementing a Least Recently Used (LRU) scheme to determine which entries to purge from the assignment history database.

15. The method of claim 3, further comprising:

purging one or more entries from the assignment history database in response to the assignment history database being full.

16. The electronic device of claim 5, wherein the at least one processing device is further configured to purge one or more entries from the assignment history database in response to the assignment history database being full.

17. The electronic device of claim 16, wherein the at least one processing device is further configured to implement a Least Recently Used (LRU) scheme to determine which entries to purge from the assignment history database.

18. The electronic device of claim 7, wherein the at least one processing device is further configured to purge one or more entries from the assignment history database in response to the assignment history database being full.

19. The non-transitory machine-readable medium of claim 9, further containing instructions that when executed cause the at least one processor to purge one or more entries from the assignment history database in response to the assignment history database being full.

20. The non-transitory machine-readable medium of claim 11, further containing instructions that when executed cause the at least one processor to purge one or more entries from the assignment history database in response to the assignment history database being full.

* * * * *